May 3, 1932.  W. K. BISHOP  1,857,106
ADJUSTABLE VEHICLE SEAT
Filed April 26, 1929  2 Sheets-Sheet 1
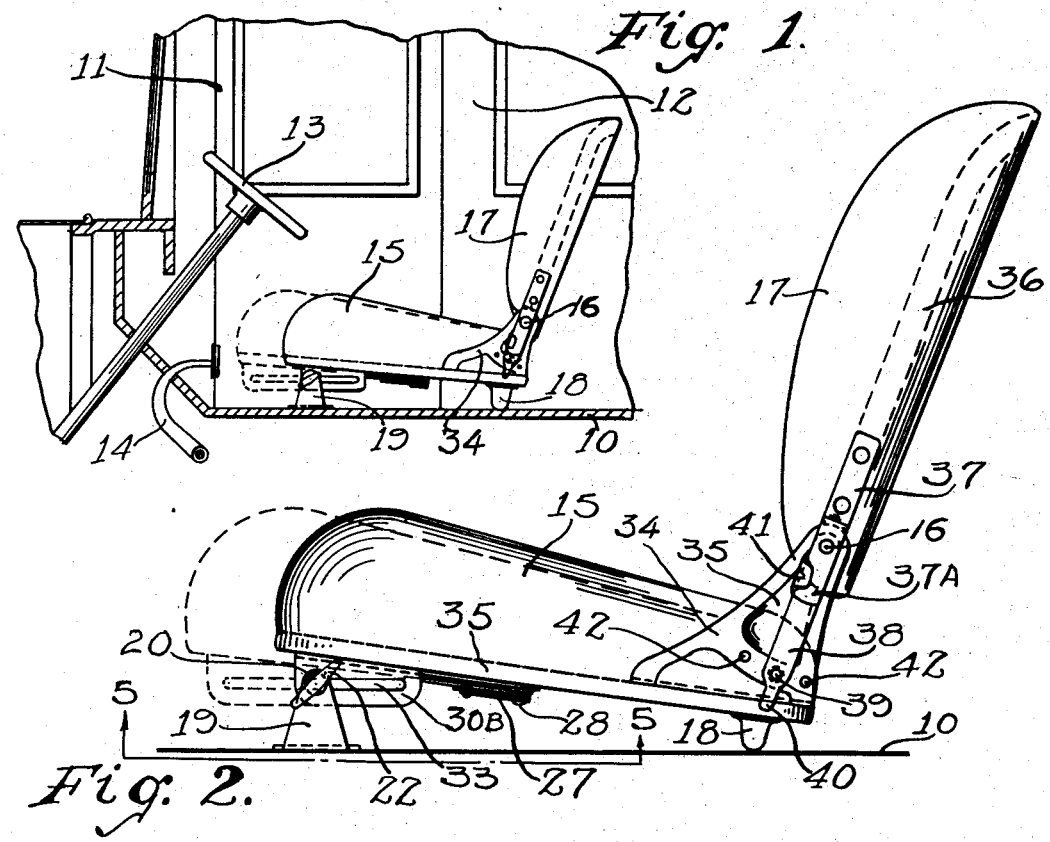
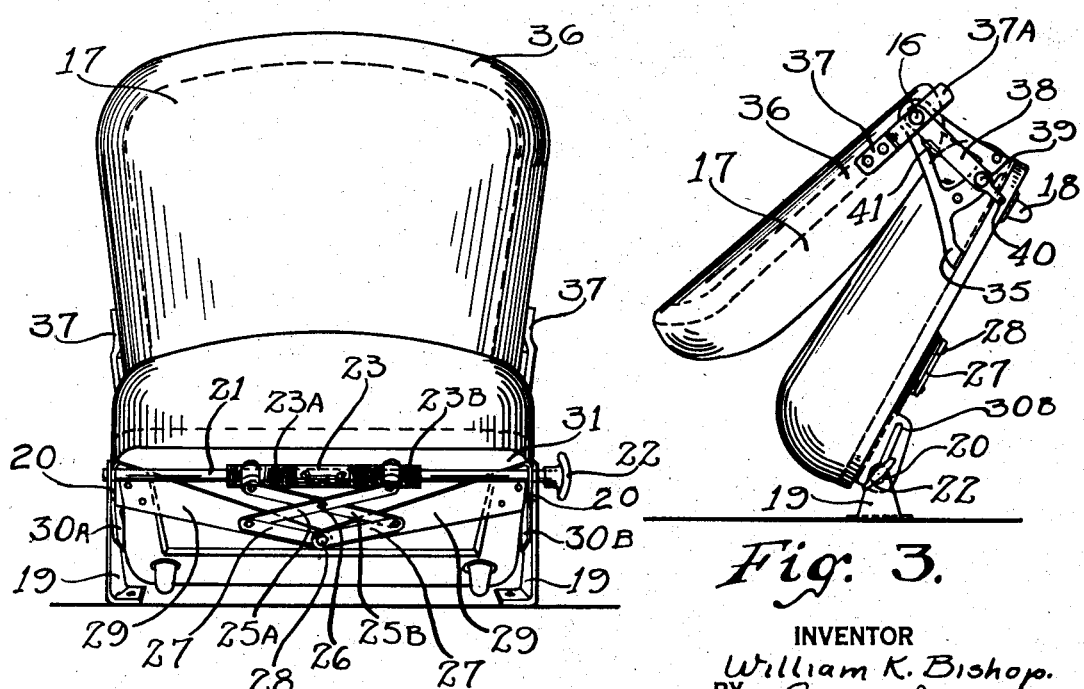
INVENTOR
William K. Bishop.
BY Louis Illmer
HIS ATTORNEY May 3, 1932.  W. K. BISHOP  1,857,106
ADJUSTABLE VEHICLE SEAT
Filed April 26, 1929   2 Sheets-Sheet 2

INVENTOR
William K. Bishop.
BY
Louis Illmer
HIS ATTORNEY

Patented May 3, 1932

1,857,106

UNITED STATES PATENT OFFICE

WILLIAM K. BISHOP, OF BINGHAMTON, NEW YORK, ASSIGNOR TO THE BREWER-TITCHENER CORPORATION, OF CORTLAND, NEW YORK, A CORPORATION OF NEW YORK

ADJUSTABLE VEHICLE SEAT

Application filed April 26, 1929. Serial No. 358,188.

This invention relates to an adjustable seat mechanism adapted to permit of bodily shifting and tilting automobile or like vehicle seats, and in particular provides for a comfortable seat of the collapsible coach type that can readily be moved toward or away from the steering wheel to accommodate drivers possessing individually different statures or leg lengths and otherwise allows of unfettered manipulation of the car pedals. The manipulative element for shifting of my seat has been placed within convenient reach of the seated driver; the seat back has also been made reclinable and provision made for alterably setting the erected back in a changed inclination with respect to the normal seat plane.

In the present embodiment, a manipulative screw shaft is rotatably mounted between a pair of stanchions fixed to a vehicle floor. This screw is equipt with companion nuts respectively arranged to cooperate with complementary ends of a scissor-like lever or shifter gear. The opposite free lever ends are linked to the bottom of the slidably mounted seat frame and supplementary guide means serve to maintain seat alignment. This constraining agency preferably comprises a pair of slotted flank flanges through which slots the screw-shaft extends; the disposition of my self-locking linkage is such that upon manipulation of the screw-shaft, both flank flanges will be positively and evenly drawn lengthwise of their respective slots. This improved adjusting mechanism may be compactly placed beneath the seat bottom and disposed to lie wholly rearward of the screw axis. The interlocked lazy-tong linkage holds the seat in a fixedly spaced relation from the screw shaft but still allows of bodily tilting the entire assembly about the shaft axis as a fulcrum without losing the original seat setting.

The object of my invention is to provide for a compact unitary linkage of the character indicated and one capable of being economically fabricated and applied to conventional automobile front seats without necessitating extensive changes in the prevailing structure thereof. To this end and the accomplishment of other new and useful results, said invention further consists in novel structural features, all of which will hereinafter be set forth in detail.

Reference is had to the accompanying two sheets of drawings which are illustrative of a specific embodiment of my invention, particularly as applied to automotive seats of the coach type, in which like characters of reference indicate like parts, and in which:

Fig. 1 is a fragmentary elevational view as taken in longitudinal section through the body portion of an automobile showing the erected front seat thereof equipt with my improved adjusting mechanism.

Fig. 2 represents an elevational side view of a coach seat assembly showing the seat shifted into its rearmost position and the back tilted into an intermediate position, while Fig. 3 illustrates the typical manner in which this seat may still be freely folded up and tilted forwardly into its fully collapsed position.

Fig. 4 illustrates a front elevational view of my erected seat and indicates the transverse disposition of the tiltable back and seat hardware.

Figure 5:
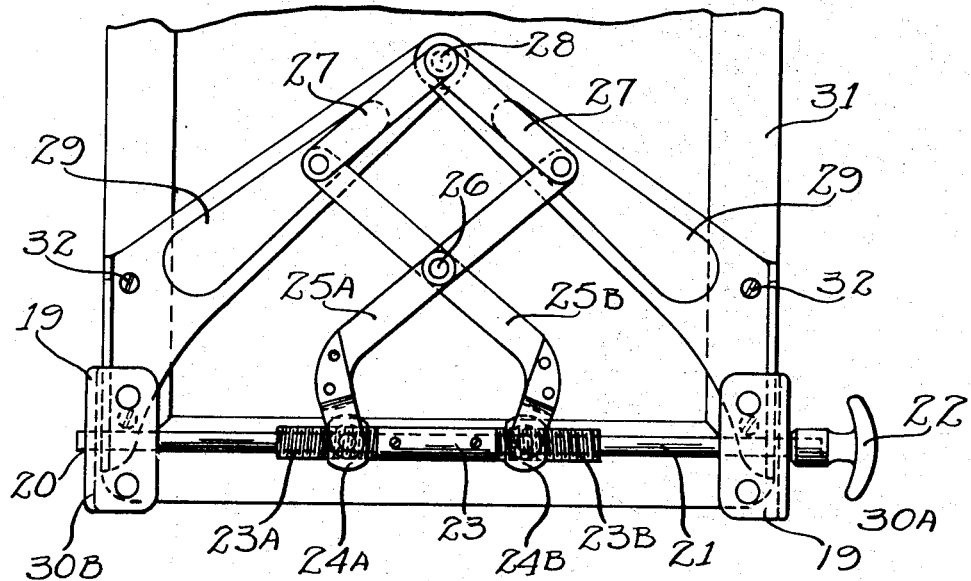
Fig. 5 shows a bottom view of my seat adjusting linkage as viewed from the line 5—5 of Fig. 2.

Referring first to Fig. 1, this is intended to schematically indicate certain conventional motor car elements that may be indirectly associated with my adjustable coach seat, namely a body floor 10, a forwardly disposed side door 11 of a coach body 12, which door serves both the front and rear seat compartments, a steering wheel 13, a control pedal 14, and the like. Located immediately rearward of said wheel, is shown a transversely disposed coach seat equipt with my improvements; this seat comprises a cushioned frame or base 15 of substantially rectangular shape to the rear top edge of which may be hingedly attached at 16, the foldable back 17. The rear bottom edge of said base is shown provided with one or more depending props such as 18 adapted to freely rest upon the floor 10.

The present invention is more largely concerned with shiftable fulcrum means for the forward portion of said seat base and provides for sheet-metal seat hardware that can in large part be readily fabricated by simple stamping and forming processes. To this end, the opposite sides of the base 15 are each provided with an upright stanchion 19 having an inturned foot adapted to be secured to the body floor. The upper end portion of such pair of spaced stanchions are each perforated to provide for the bearing 20, and mounted therethrough is an adjustable fulcrum shaft 21.

One overhanging end portion of this transversely disposed shaft may be provided with a manipulative knob 22 preferably placed to one side of the seat base within convenient reach of the seat occupant. Said shaft is retained in an axially fixed relation to the supporting stanchions; intermediate the shaft ends there may be mounted a tubular sleeve 23 whose opposite ends are shown as provided with right and left hand thread lengths 23A and 23B respectively, and this sleeve is intended to be suitably secured to the shaft. Respectively cooperating with said spaced threads, are the nuts 24A and 24B held against rotation and adapted to be drawn toward each other whenever the knob 22 is turned in one direction and to separate whenever said knob is turned in a reverse direction. Such relative nut movement is utilized in moving the seat base fore or aft of the vehicle and in a transverse relation to the shaft axis.

A lazy-tong type of linkage is preferably resorted to for operatively connecting the shaft with said base; this linkage primarily comprises two similar but oppositely disposed tong levers 25A and 25B that are pivoted together at 26. The complementary forward ends of the tong levers may each be forked and adapted to pivotally engage with the respective shaft nuts 24A and 24B. The opposite ends of said crossed levers are respectively interconnected by complementary toggle links such as 27 which in turn are made to engage with the common rear pivot point 28 that also serves as an actuated thrust lug when shifting the seat base.

The last named rivet type of pivot may be carried by an elongated holder plate designated in its entirety as 29. Said holder is preferably but not necessarily formed up into complementary angle-shaped sections of which one leg of each such section is shown as connected through the rivet pin 28 while the respective outermost holder leg ends are bent down to constitute the spaced depending flank flanges 30A and 30B. As will be understood, the cushioned seat base is usually provided with a wooden skeleton frame 31 (indicated in dotted outline) beneath which the holder plate may readily be secured by screws such as 32.

Figure 6:
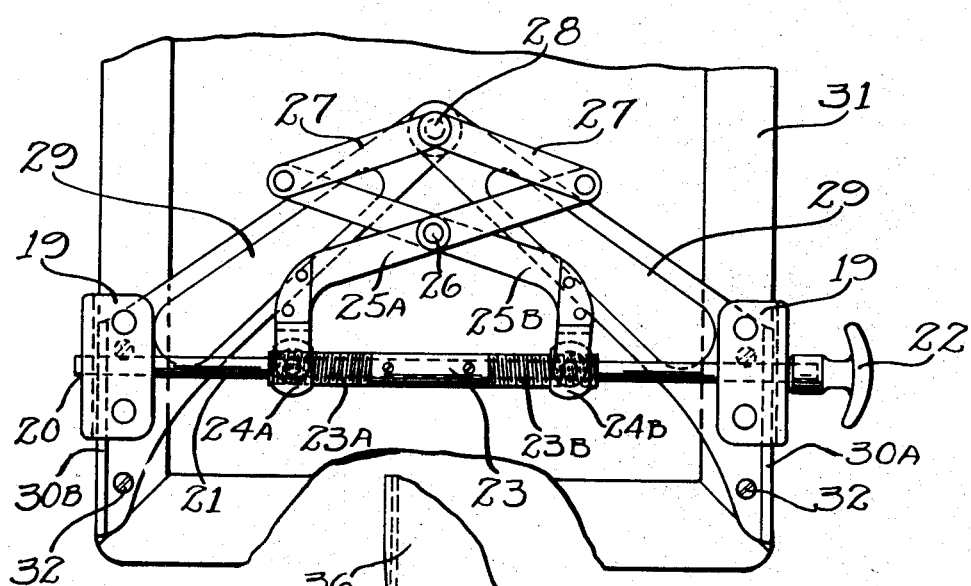
Fig. 6 is a similar view except that the seat base has now been drawn into its foremost position.
Figure 7:
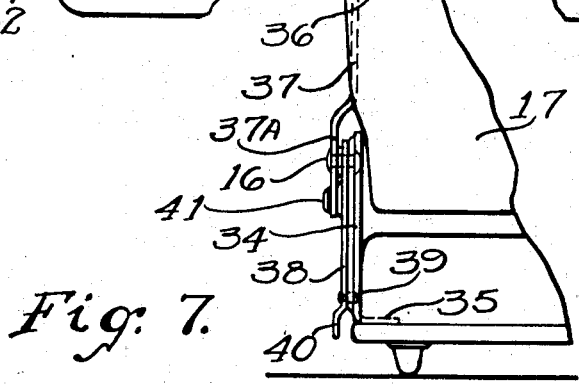
Fig. 7 represents a fragmental rear elevational view of my coach seat further detailing the bracket fulcrum devices as used in connection with my tiltable back member.

It will be observed that each of the flank flanges are provided with a longitudinal slot 33 associated with the respective seat sides and disposed in a substantially parallel relation to the bottom of the base 15. The end portions of the fixedly mounted fulcrum shaft 21 are respectively entered through their adjacent flange slots, such that the seat base may be bodily shifted away from or toward said shaft in the fashion indicated by dotted outline in Fig. 2. The mode by which the described linkage accomplishes this purpose is made apparent in Figs. 5 and 6. The first named figure shows the relation of my lazy-tong mechanism that prevails when the seat base assumes its rearmost position with respect to the body floor; at that time proper turning of the knob 22 will have drawn the shaft nuts 24A and 24B together and make the distance between the pivots 26 and 28 a maximum, thus throwing the seat base in its furthermost position relative to the fixedly mounted shaft 21. A counterwise rotation on part of the knob 22, serves to thrust apart the nuts 24A and 24B along their respective threads 23A and 23B, which in turn opens up the end spacing between opposite ends of the crossed tong levers 24A and 24B; hence in cooperation with the complementary links 27, the plate pivot 28 will be forcibly drawn toward the stationary stanchion 19.

The described means serve to bodily shift the erected seat fore or aft of the vehicle even when loaded with the weight of the occupant. Said linkage is wholly disposed underneath the seat base and is so arranged that the fulcrum shaft will be positively held lengthwise of the respective flange slots and yet at all times allow the seat base and back to be bodily tilted upwardly about the adjusted shaft in the fashion indicated in Fig. 3; in this collapsed position, the seat is intended to afford an unobstructed passageway between the side door 11 and the rear seat compartment of a coach body, it being understood that two independent and relatively narrow front seats of the kind described are usually placed side-by-side.

Turning now to the additional hardware required to allow of both adjustably altering the inclination of the erected back 17 and of collapsing the same upon the seat cushion as indicated, this may be brough about by the use of stamped metal fulcrum brackets such as 34 which may be given a neat and ornamental appearance; each such bracket provides for an inturned foot flange 35 adapted to be firmly secured to a rearward portion of the upper face of the base frame 31 as shown.

These upstanding brackets are oppositely disposed and respectively provided with a back fulcrum 16. The back upholstery is usually mounted upon a rectangular wooden framework (shown in dotted outline and designated as 36) of which the outermost edges of the respective side bars may each be provided with an offset side strap 37 having an aperture intermediate its ends adapted to embrace one of the bracket fulcrums 16. The overhanging depending strap end 37A that extends beyond said fulcrum, serves as a stop for the tiltable back 17.

Disposed underneath one or both of said strap ends is a laterally yieldable shifting lever 38 of which one end portion is apertured and mounted to swing around the fulcrum 16 while the other lever end portion may be provided with a tipped detent 39 and is made to terminate into a finger piece 40. Intermediate the shifting lever ends, there is further carried an overhanging stop lip or abutment means 41 disposed outwardly from the seat and adapted to interlockingly embrace the forward edge of said depending strap portion 37A. Referring further to the bracket structure, this may be equipt with a series of spaced indentations or notches 42 that are preferably arranged in a radial relation about the pivot 16 and adapted to selectively co-operate with said detent; any one of the notches may be brought into interlocked engagement with the detent 39 by springing the finger piece 40 outwardly and away from its adjacent bracket face and thereupon shifting the lever into another notch position; the lip 41 is thereby moved into a different adjustment with respect to its co-acting stop element 37A.

Assuming the bracket members to be set as shown in Fig. 1, then the reclinable back as fulcrumed between the complementary pivots 16 will be positively stopped against rearward tilting when the depending strap end 37A abuts the stop lip 41. Whenever the back is tilted forwardly into its collapsed position as shown in Fig. 3, the lever 38 is allowed to remain in adjusted position because the joint between the abutting stop elements 37A and 41 is designed to break freely. Hence the back may at will be tilted forwardly into collapsed relation with respect to the upholstered base, irrespective of the notch position into which said adjustable lever may have been placed. As will be obvious, it is not essential that the shifting lever 38 be applied to both side edges of the back although the described balanced arrangement is preferred.

By virtue of the previously described refinements herein embodied for bodily shifting the base and seat back, my seat as a whole may be adjusted in various combinations designed to best meet individual preferences on part of different drivers. The length of the slot 33 is preferably so disposed as to allow the collapsed seat to be thrown forwardly about the fulcrum shaft 21 without floor interference.

It is to be understood that the described adjusting mechanism also finds application to purposes other than automotive drivers' seats, and that various changes in structure and mode of application thereof may be resorted to in likewise carrying out my illustrative coach seat embodiment, all without departing from the spirit and scope of my invention heretofore described and more particularly pointed out in the appended claims.

Claims:

1. In a vehicle seat adjuster, the combination of a horizontally shiftable and vertically tiltable base member for the seat, a stationary support associated with each forward end region of said seat base, a manipulative fulcrum shaft rotatably mounted between said supports and which shaft is provided with complementary threads, nut means for each shaft thread, a single pair of mated scissor-like levers of the self-locking type whose adjacent lever end portions are forwardly disposed and operatively connected for actuation from the respective nuts and which scissor-like levers are disposed to lie in a plane aligning substantially with the axis of said fulcrum shaft, link means interconnecting the rearwardly disposed lever ends to said base and serving in cooperation with said levers to positively and bodily shift said base relative to the manipulated shaft in a direction lengthwise of the aforesaid plane, said levers and links being disposed to allow of bodily tilting the base about said fulcrum shaft as an axis of rotation, and liftable prop means supporting the seat in a rearwardly spaced relation to the shaft axis.

2. In a vehicle seat adjuster, the combination of a laterally shiftable base member for the seat, a stationary stanchion associated with each seat end region of said base, a manipulative screw shaft rotatably mounted between said stanchions and which shaft is provided with spaced complementary threads, nut means cooperating with each shaft thread, mated scissor-like levers of the self-locking type whose adjacent end portions are operatively connected for actuation from the respective nuts, and a slotted guide flange carried by each of the aforesaid base end regions and having the fulcrum shaft extending through the respective slots thereof, the manipulation of said shaft serving to positively shift said flanges lengthwise of their slots.

3. In a vehicle seat, the combination of a laterally shiftable seat base, a pair of stationary support stanchions respectively associated with the seat end regions, bearing means for each such stanchion, a manipulative fulcrum shaft mounted between said bearings and which shaft is provided with oppositely disposed screw threads, nut means for each of said threads, holder means secured to the base and comprising spaced flank flanges each having a slot and which slots are respectively adapted to slidably receive the shaft therethrough, thrust lug means and a self-locking linkage including a pair of crossed levers having complementary end portions respectively adapted to be positively actuated by said nuts together with a toggle link interconnecting the opposite lever ends and pivotally engaging with said lug for base shifting purposes.

In testimony whereof I have herewith set my hand this 23rd day of April, 1929.

WILLIAM K. BISHOP.